Figure 1:
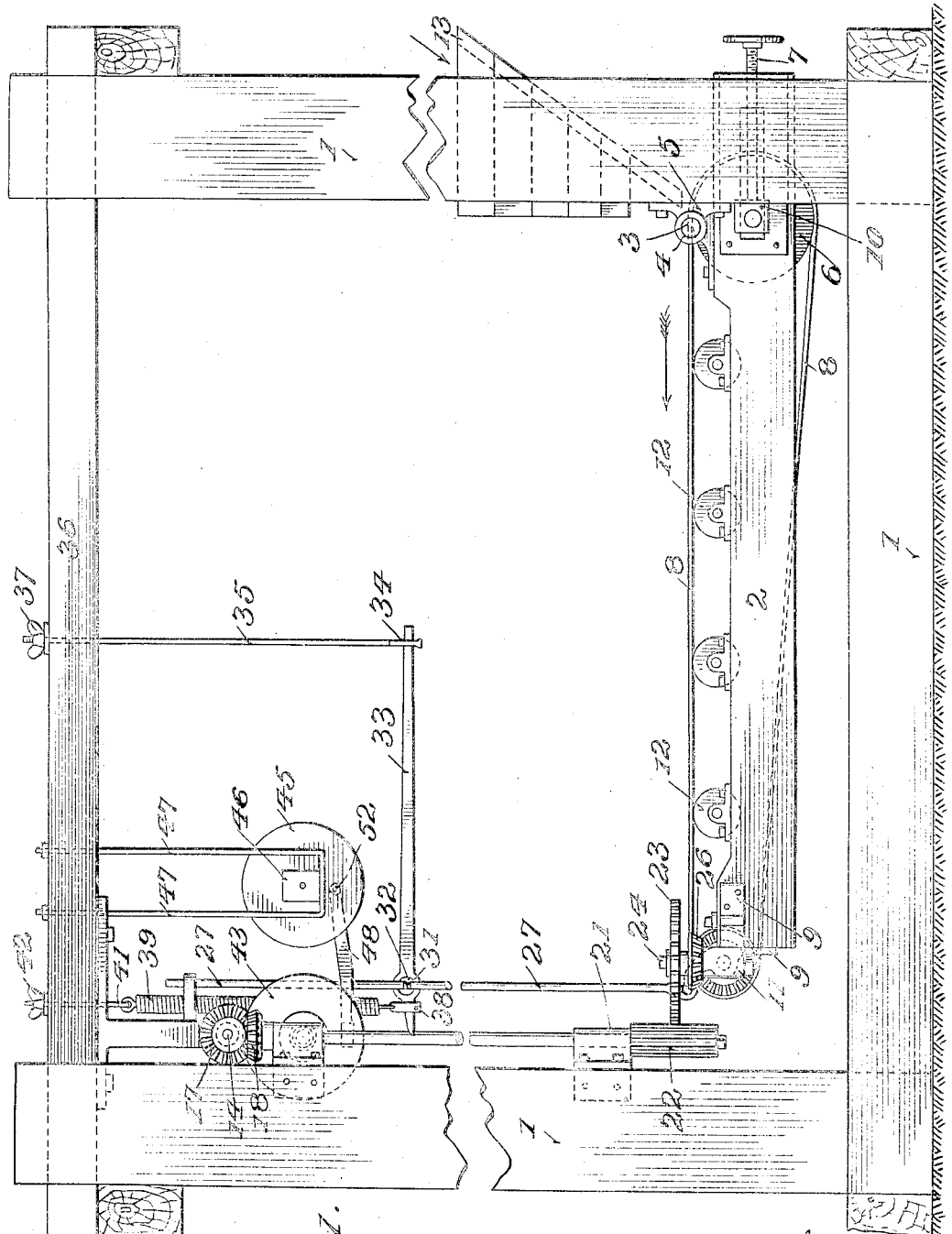

H. E. T. HAULTAIN & E. S. WIARD.
WEIGHING APPARATUS.
APPLICATION FILED FEB. 17, 1909.

1,038,863.

Patented Sept. 10, 1912.

2 SHEETS—SHEET 1.

Witnesses
W. A. Williams.
Henderson F. Hill

Inventors
Herbert E. T. Haultain
Edward S. Wiard

By Ridout & Maybee
Attorneys

H. E. T. HAULTAIN & E. S. WIARD.
WEIGHING APPARATUS.
APPLICATION FILED FEB. 17, 1909.
1,038,363.
Patented Sept. 10, 1912.
2 SHEETS—SHEET 2.
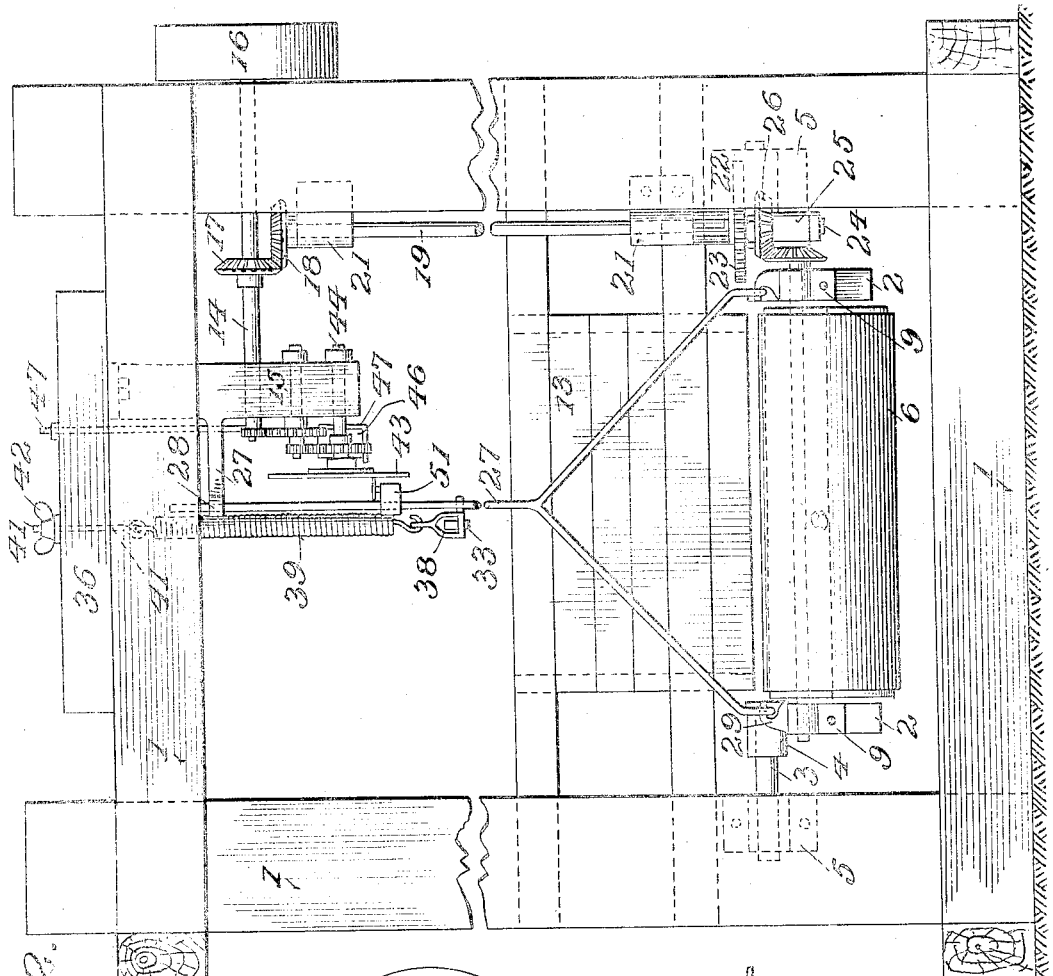
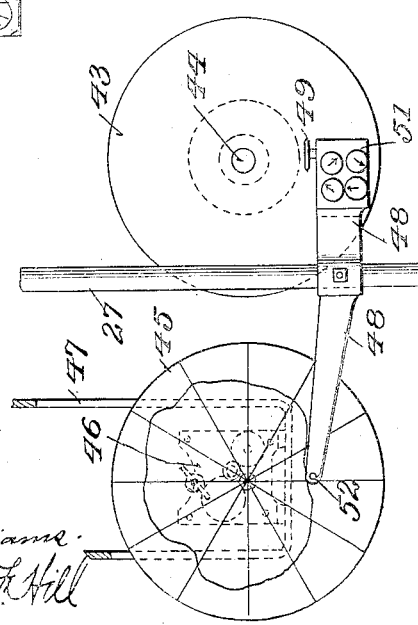
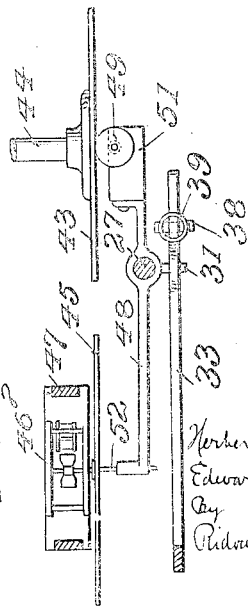
Witnesses
W. A. Williams
Henderson F. Hill
Inventors
Herbert E. T. Haultain
Edward S. Wiard
By
Ridout & Maybee
Attorneys

UNITED STATES PATENT OFFICE.

HERBERT E. T. HAULTAIN, OF TORONTO, ONTARIO, CANADA, AND EDWARD S. WIARD, OF DENVER, COLORADO.

WEIGHING APPARATUS.

1,038,363.  Specification of Letters Patent.  Patented Sept. 10, 1912.

Application filed February 17, 1909. Serial No. 478,483.

*To all whom it may concern:*

Be it known that we, HERBERT E. T. HAULTAIN, a subject of the King of Great Britain, residing at Toronto, in the county of York, Province of Ontario, Canada, and EDWARD S. WIARD, a citizen of the United States, residing at Denver, in the county of Denver, State of Colorado, have invented certain new and useful Improvements in Weighing Apparatus, of which the following is a specification.

Our invention relates to weighing apparatus intended to weigh continuously a stream current or body of material, carried upon a moving surface, such as an endless belt, and to do this regardless of the density of material passing through the apparatus.

Apparatus has been, and is now in use in which a moving belt carries material which is weighed in transit; but we wish to make a clear distinction between such apparatus and its mode of operation, and that described in the present application, there being a radical fundamental difference between the two. In the parts already in use the weighing is intermittent; that is to say, that if we assume a belt whose upper surface is four feet long, the amount of material will not be weighed until the belt has received sufficient material to operate some kind of tripping device or clutch releasing mechanism, whereby the weighing devices are permitted to act and to weigh the amount of material then upon the belt; not to come into operation again until the belt has again received sufficient material. We term this intermittent weighing, because although there may be a continuous feed, there are practically separate bodies or charges of material separately weighed, and the weighing apparatus remains inactive between the times at which its intermittent action occurs. In clear distinction from that method of operation, weighing, according to our invention is continuous and constant, the weighing mechanism is at all times in operation, and so long as material is supplied it will be constantly weighed.

The main principle of our invention is therefore the constant weighing of moving material as distinguished from the intermittent weighing of such material. As auxiliary to apparatus embodying said principle we refer especially to a device which we term an integrator and which may operate a permanent register or record of weight. We may also employ a load indicator the results shown by which refer to the load on the conveyer at any given time and as the conveyer speed is constant will also indicate the rate—that is units of weight per units of time—at which the material is passing a given point.

An embodiment of our invention is shown in the accompanying drawings and will be hereinafter described. We do not submit this as the only embodiment of our invention, because within the principle above laid down, constructions may be varied and changed for equivalent forms; but such embodiment shows a practical construction, and is therefore to be taken as illustrative of other and equivalent constructions falling within said principle and the spirit of our invention.

In the drawings: Figure 1 is a side elevation of a complete machine embodying the invention; Fig. 2 is an end view looking toward the left hand end of Fig. 1; Fig. 3 is a rear elevation of the indicating and integrating devices; Fig. 4 is a plan view of the same parts, the operating time movement for the indicator being shown in horizontal section.

All the operative parts of the machine are supported by a suitable frame 1, shown as composed of sills, uprights and cross pieces and which in the drawings is of a substantially rectangular form either in side or end elevation. Near the bottom of the machine is a belt frame 2 at one end of which are secured gudgeons 3, which work in cylindrical bearing parts of brackets 5, secured to the vertical end posts of the main frame, by which construction the belt frame is pivoted at one end to the main frame, leaving its other end free to rise and fall as it moves in said bearings. At the pivoted end of the belt frame is journaled in adjustable bearings 10 a roller 6. Bearings 10 are adjusted by a screw 7 in order that the belt 8 may be kept at the proper degree of tension. At the free end of the belt frame are brackets 9, having bearings for the end roller 11 over which the endless belt passes. Idle rollers 12 are journaled on the belt frame to support the upper surface of the belt. The latter can be of any suitable construction and material. Supported in the main frame at the hinged end of the belt is a feed hopper 13, deriving its supply of material from any suitable source and transmitting such material to the surface of the belt, along with which such material is carried in the direction of the arrow in Fig. 1. The belt is driven by gearing from a driving shaft 14, journaled in the main frame and in a bracket 15, secured to the same, and having a driving pulley 16. A bevel-pinion 17 on this shaft drives, through a similar pinion 18, a vertical shaft 19 journaled in bearings 21 on the main frame. Fixed upon this shaft is an elongated spur gear 22, which meshes with another spur gear 23, fixed on a shaft 24 which turns in a bearing 25 secured at the end of the belt frame and which forms part of the bracket 9. The shaft 24 carries a tight bevel-pinion 26. This last named pinion engages a similar pinion on the shaft of the end roller. The purpose of the elongated spur gear 22, is of course to permit the free end of the belt to rise and fall without disengaging such gear from the gear 23 which moves with the belt frame and belt.

The free end of the belt frame is supported by a hanger 27, whose upper end slides in a guide 28 projecting from the bracket 15. This hanger is forked as shown in Fig. 2 and the ends of the separate arms thus formed have V-shaped orifices which form knife edged bearings in connection with knife edged projections 29 extending upwardly from the brackets 9 on the belt frame. The hanger 27, above its fork has a knife edged projection 31, which rests in an orifice 32 in a lever 33. This lever has a similar bearing at 34 in a loop formed at the lower end of a vertical rod 35, which is suspended from an upper longitudinal part 36 of the main frame, and has a threaded end which receives a butterfly nut 37 by which it is held at any proper and desired adjustment. The free or outer end of lever 33 has a knife edged bearing in a loop or clevis 38 secured to the lower end of a tension spring 39. The upper end of the spring 39 is hooked to an adjustable rod 41 suspended from the framing piece 36; and the tension of the spring can be properly regulated by this rod which can be secured in any adjustment by a nut 42. It will now be understood, that as the material passes along with the belt the free end of the latter will be depressed, and will continue to be more or less depressed so long as any material is upon the belt; and that unless the material is of absolutely constant density the depression will be variable according to the extent to which the tension of the spring is overcome by the weight which is supported by it. The connection from the belt is through the hanger 27, and thence through the lever 33 to the spring itself, and the elongation of the spring is exactly proportional to the weight on the belt transmitted through hanger 27. The spring is so adjusted by the rod 41 and nut 42 that it responds to any increase of weight caused by material upon the belt.

The circular disk 43 is mounted upon a shaft 44 journaled in the bracket 15; and this disk is geared down from the driving shaft 14 by the train of gears and pinions shown in Fig. 2, and interposed between shafts 14 and 44. A disk 45 secured to an arbor of a time movement 46 is supported by a stirrup 47 from the overhead beam 36. This disk can be adjusted to revolve once for any predetermined period as for instance the hours of work in any establishment, or as more convenient, the said arbor may be the ordinary hour hand arbor rotating once every twelve hours. Associated with these two disks, but having separate and independent functions relatively to them, is an arm 48 fixed upon the hanger 27 as shown in Fig. 3. One end of this arm projects toward and over the disk 43 and carries a rotary integrating wheel or roller 49, which bears upon disk 43 and derives motion from its revolution. The shaft of the wheel 49 extends into the register casing 51 which contains any suitable train and means for displaying continuous indications at visual openings in a well known manner. The other end of the arm 48 extends toward and over the disk 45 and carries a marking point 52. The surface of the disk 45 is covered with a sheet of paper suitably ruled radially so as to express fractions of time such as hours and so forms a time controlled chart. When the belt is empty its weight and that of its frame act upon the properly adjusted spring and bring the integrating wheel to the center of disk 43, and the marking point to the center of disk 45. Now as the disk 43 and belt driving roller 11, are driven by gearing to which motion is communicated by a driving shaft common to both, the speed of the belt and of said disk can be and are made exactly proportional, and any variation in the speed of the driving and gearing affects both equally. When there is a load upon the belt, the hanger 27, and the arm 48 carried by it are depressed and the integrating wheel 49 will be moved from the center of disk 43 in exact proportion to the weight upon the belt at any moment. The fulcra 31, 34, 38 will have been so adjusted relatively that with a given load on the conveyer the integrating wheel is moved a predetermined distance from the center of disk 43. The operation of this part of the apparatus will be rendered more intelligible by an imaginary illustrative example. We will assume for instance that with a weight of 100 pounds on the conveyer the integrating wheel 49, will be moved two inches from the center of disk 43, and that such wheel is one inch in diameter. Also that the conveyer has a weight carrying surface four feet long and that the disk 43 makes one revolution for four feet of belt travel. These assumptions are perfectly practical since it is only a matter of calculation and of care and skill in construction to carry them into effect. If the supply of material to the belt is uniform so that the load upon it at all times is 100 pounds, then for every four feet of travel 100 pounds passes off the belt. Under these conditions the wheel 49 rotates upon disk 43 at a distance from its center represented by a circle on the disk whose diameter is four inches; and as the wheel is one inch in diameter it will make four revolutions per each revolution of the disk, for each four feet of travel of the belt, and for each 100 pounds of material. By a similar calculation, if the load were 50 pounds, the integrating wheel would make only two revolutions for one of the disk and for each four feet of travel.

Although in the above explanation, we assume a uniform supply to the belt for the sake of clearness, it is probable that such conditions would seldom be present in practical work; but it makes no difference whatever whether the supply be uniform or variable, because the number of revolutions of wheel 49 depends in all cases upon its distance from the center of disk 43, which is in exact proportion to the weight of material passing over the belt; and although that distance may be constantly varying as the weight varies, the completion of the number of revolutions proportional to the belt travel and to the predetermined weight will cause the register to be operated, and visible indications to be continuously shown at the sight openings in its casing.

While the weighing and registering are proceeding, the load indicating device when used is furnishing a load diagram on the paper surface of the disk 45, its marking point tracing a line as the disk revolves which shows the rate at which the material passes off the conveyer at each minute of the day.

We have not shown any destination for the material passing off the belt, because such destinations would be different according to the kind of material being conveyed, and form no part of our invention. It will be understood, however, that the material when weighed and free of the belt is carried or caused to travel farther for storage or subsequent treatment of any kind appropriate to its nature.

What we claim as our invention is:

1. In weighing apparatus, a depressible movable conveyer, in combination with supporting yielding means governed as to the extent of their yielding by the weight of material upon the conveyer; a continuously-acting weight register geared to the conveyer; a load indicator for indicating, relatively to elapsing time, the passage of material with and off of the conveyer; and means governed as to position by the extent of yielding of the suspension means, for controlling the operation of the weight register and of the load indicator.

2. In apparatus for continuous weighing, a depressible movable conveyer, in combination with yielding devices supporting the same; a driving shaft; a rotary disk; separate trains of gearing driven from said shaft and driving, respectively, the conveyer and the said rotary disk; a second rotary disk; a time movement for driving the same; an arm carried by the said suspension devices and having at one end an integrating wheel in contact with the first disk, and at the other a marking point in contact with the second disk; and a register operated by the integrating wheel, whereby weights are continuously registered by said register, while at the same time the marking point traces a continuous line indicating the passage of material with relation to elapsing time.

3. In apparatus for continuous weighing, the combination of a belt frame hinged at one end and free at the other; an endless belt movable in said frame; devices supporting the free end of the belt frame and adapted to yield to an extent proportionate to the weight upon the belt; means for driving the belt; means geared to the belt for continuously integrating and registering the weight of the material transported, including means whereby the rate of registration is controlled by the extent of yielding of said supporting devices.

4. In apparatus for continuous weighing, a traveling endless depressible belt, in combination with gearing for driving same; a rotary integrating disk; gearing for driving said disk at a speed which is proportionate to the speed of the belt; a yieldably mounted support for the belt; an integrating wheel carried by said yielding support and driven by frictional contact with said integrating disk; and a continuously acting register driven by said integrating wheel, whereby with a uniform supply to the belt the integrating wheel rotates at a certain distance from the center of said disk while with a variable supply to the belt the said wheel rotates at variable distances from said center and faster or slower according to its position relatively to said center, and in all cases continuously operates said register.

5. In apparatus for continuous weighing, a depressible belt frame hinged at one end and free at the other; an endless traveling belt carried by said frame; a hanger connected to the free end of the belt frame;

a pivoted lever supporting said hanger; a spring supporting the free end of said lever; weight registering devices geared to the conveyer; and means whereby said devices are regulated in their operation by the depression of the belt frame.

6. In apparatus for continuous weighing, a depressible frame and belt in combination with a hanger connected to the belt frame; a pivoted lever supporting said hanger; a spring supporting the free end of said lever and adapted to yield to weight transmitted through said hanger and lever; a rotary integrating disk; an arm carried by the hanger and supporting an integrating wheel rotated by frictional contact with said disk; and a register operated by said integrating wheel, the rotations of said integrating wheel being controlled by its distance from the center of said disk, which distance is in turn governed by the extent of depression of the belt frame.

7. In apparatus for continuous weighing having a depressible belt frame and belt suspended from yielding supports, means for driving the said belt continuously without regard to its vertical changes in position, such means comprising a driving shaft; a counter-shaft geared thereto; an elongated spur gear upon said counter-shaft; an ordinary spur gear meshing with the elongated gear; a belt supporting roller; and bevel pinions interposed between the ordinary spur gear and the belt supporting roller whereby the belt frame can rise and fall without disengaging said spur gear, and consequently without affecting the driving.

8. In weighing apparatus, a depressible conveyer adapted to carry a continuous supply of material and having a hinged support whereby the effect of each part of the traveling load gradually increases from zero to the maximum as it moves onto and along the depressible conveyer, in combination with a continuous acting weight integrating device; means for driving said device actuated at a rate proportionate to the rate of travel of said material; and means whereby the said integrating device is governed as to rate of action in proportion to the depression of the conveyer.

9. In weighing apparatus, a depressible load supporting frame across which a load may be caused to travel, said frame being hinged at one end in order to cause the effect of the traveling load to gradually increase from zero to the maximum, in combination with a weight integrating device; means for driving said device, actuated at a rate proportionate to the rate of travel of the load; and means whereby the said integrating device is governed as to rate of action in proportion to the depression of the aforesaid frame.

Dated at Toronto, Ont., this 2nd day of February, 1909.
  HERBERT E. T. HAULTAIN.
 Witnesses:
  E. MERNER,
  I. S. TOVELL.

Dated at Denver, Colorado, this 27th day of January, 1909.
  EDWARD S. WIARD.
 Witnesses:
  HARRY R. ARNETT,
  HENRY F. BEHUEMAN.